United States Patent [19]

Rodriguez

[11] Patent Number: 4,858,942
[45] Date of Patent: Aug. 22, 1989

[54] MANUALLY DRIVEN BICYCLE

[76] Inventor: Otto Rodriguez, 8465 Timberlake Dr., Riverdale, Ga. 30296

[21] Appl. No.: 231,486

[22] Filed: Aug. 12, 1988

[51] Int. Cl.$^4$ .......................... B62K 19/00; B62M 1/12
[52] U.S. Cl. .................................... 280/233; 280/250; 280/281.1
[58] Field of Search ............... 280/250, 249, 234, 233, 280/281 R, 281.1

[56] References Cited

U.S. PATENT DOCUMENTS

| | | |
|---|---|---|
| 505,373 | 9/1893 | Sanford ............................... 280/250 |
| 4,548,420 | 10/1985 | Patroni ................................ 280/234 |

*Primary Examiner*—John A. Pekar
*Attorney, Agent, or Firm*—James B. Middleton

[57] ABSTRACT

A bicycle has both manual drive and pedal drive assemblies which may be operated simultaneously or independently. The manual drive assembly is connected to the front wheel and the pedal drive assembly is connected to the rear wheel. Both the manual and pedal drive assemblies incorporate chain drive mechanisms as well as crank assemblies. The manual crank assembly is mounted at the top of the front fork journal and also serves as a handlebar assembly for steering the bicycle. In order to provide sufficient clearance between the chain which extends alongside the front forks and the frame, the frame is bent laterally (just behind the steering sleeve) to accommodate the chain during steering movements. In a first embodiment, the frame member extends generally downwardly and rearwardly from the steering sleeve to a sufficient degree to provide sufficient clearance between the crank assembly to allow the bicycle to be steered while the front wheel is being manually driven. In a second embodiment, the horizontal frame crossmember is bent downwardly to a sufficient degree to provide sufficient clearance between the crank assembly to allow the bicycle to be steered while the front wheel is being driven.

5 Claims, 1 Drawing Sheet

U.S. Patent  Aug. 22, 1989  4,858,942
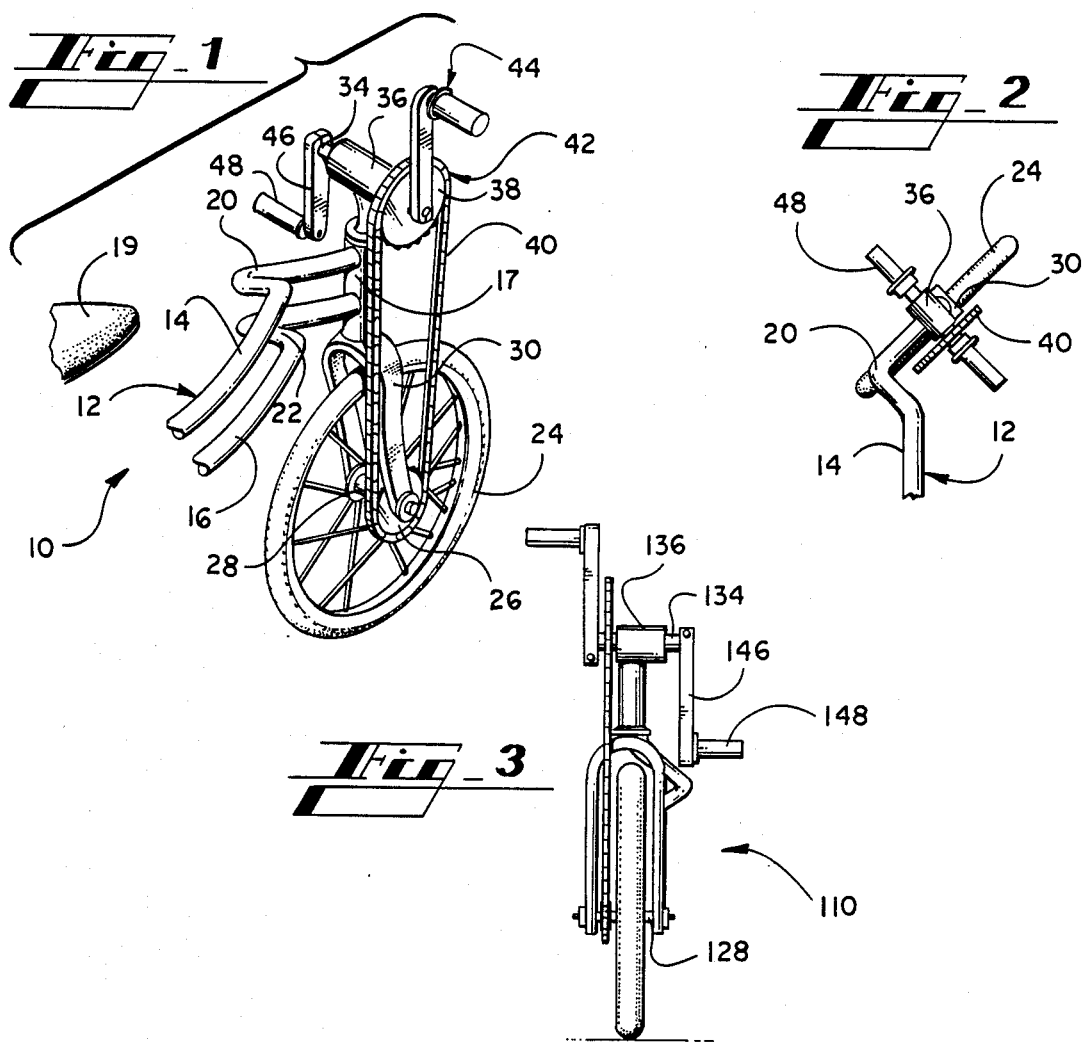
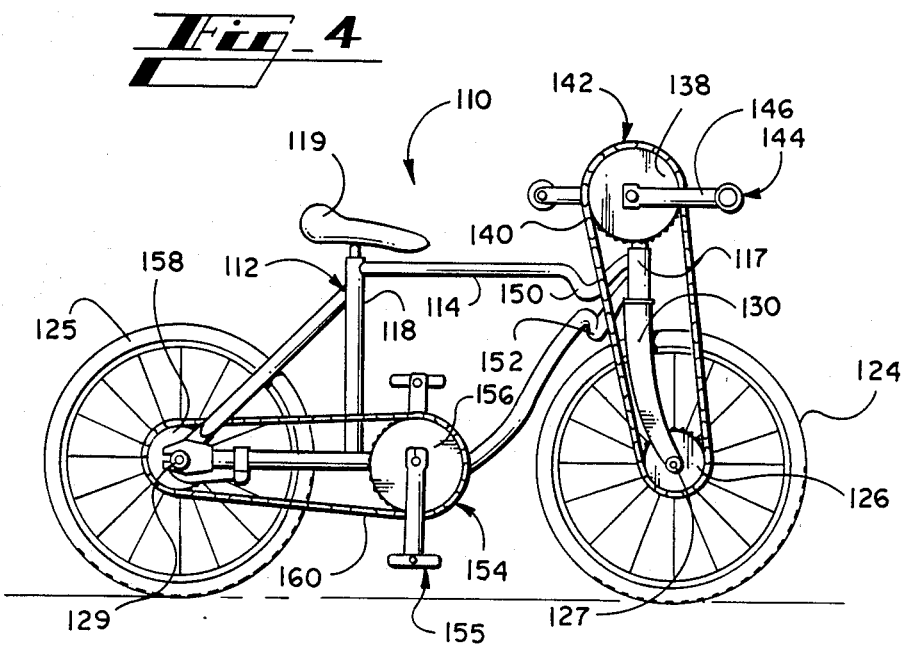

MANUALLY DRIVEN BICYCLE

BACKGROUND OF THE INVENTION

The invention relates generally to bicycles and more particularly to bicycles which can be propelled by both foot pedals and hand cranks.

Although bicycles are used throughout the world as a means of transportation, they have become increasingly popular as a means of attaining physical fitness. Consequently, bicycles have become more technologically sophisticated and expensive as a result of efforts to increase their capabilities and energy efficiency. However, the great majority of bicycles in use rely on leg power for propulsion. Many manually driven bicycles have previously been designed for the purpose of providing a bicycle having the inherent advantage of allowing the user to exercise his arms and upper torso as well as his legs. However, such designs have been unsatisfactory and such prior art manually driven bicycles have not enjoyed widespread popularity.

Many prior art manually powered bicycles have sought to capitalize on the pushing and pulling force a cyclist exerts on the handlebars during use. Such prior art bicycles have consequently used a push/pull mechanism integrated in the handlebar assembly to rotate the front wheel. An example of such prior art design is disclosed in U.S. Pat. No. 4,147,370 to Lindsey, Jr. The Lindsey bicycle incorporates a drive sprocket securely connected to the steering head. The drive sprocket is connected to the handlebars by means of a reciprocating connecting rod. Since the driven sprocket has a clutch assembly, the Lindsey bicycle has a pair of biasing springs attached to the connecting rods to prevent the drive sprocket from remaining on its dead center position each 180° of rotation which could otherwise result in a reversal of the direction of rotation of the sprocket at either extreme limit of travel (dead center position) causing a sudden removal of the resistance force of the handlebar and consequent injury to the cyclist. The main disadvantage of such prior art designs, however, is their inherent complexity. The complicated system of levers and linkages can tend to bind and be generally trouble prone as well as very energy inefficient.

Another prior art bicycle using a handlebar drive system is disclosed in U.S. Pat. No. 4,548,420 to Patroni, Jr. The Patroni bicycle is similar to the Lindsey bicycle in that it uses a push-pull lever system to rotate the front wheel. The handlebars are mounted on a yoke which rides on a guide pin at the top of the steering head. The handlebar yoke is connected to a connecting rod which drives the drive sprocket. The motion of the handlebars during rotation of the front wheel is generally that of a figure eight. However, a primary disadvantage of such a prior art design is that some cyclists find such a handlebar motion to be awkward and not conducive to smooth operation of the bicycle. In addition, this somewhat complicated system of levers and linkages may tend to bind (just as with the Lindsey bicycle) and its many connection points result in excessive frictional energy losses thereby reducing the energy efficiency of the bicycle. Moreover, the frequent change in directional motion of the torso necessitated by the particular type of front wheel drive operation makes it more difficult for the user to steer the bicycle.

Another prior art manual drive bicycle incorporates a manual drive mechanism in addition to a conventional steering assembly. Such a prior art bicycle is disclosed in U.S. Pat. No. 3,823,959 to Winters. The Winters bicycle has a conventional handlebar assembly mounted on the steering head while a separate manual operating assembly for the front wheel drive assembly is also mounted on the steering head behind the handlebars. Consequently, if a cyclist is using both hands to manually drive the bicycle, he cannot properly steer the bicycle because his hands are on the crank handles. If he uses one hand to steer the vehicle and the other hand to manually power the vehicle, he is somewhat off balance and in an awkward position and cannot either manually drive or steer the vehicle very well. Thus, separation of the steering system and manual drive system results in the bicycle being difficult to use.

Other prior art bicycles have sought to enhance the manual driving and maneuvering capabilities of such bicycles by integrating the manual drive and steering assemblies. One example of such a prior art bicycle is disclosed in U.S. Pat. No. 484,712 to Hartley. The Hartley bicycle uses a chain drive system having a drive sprocket mounted on the steering head. The handlebars are journaled in the drive sprocket so that the handlebars may also be used as cranks to rotate the drive sprocket. However, since the chain extends alongside the front forks, turning the handlebars sharpely to the right will cause the chain to contact the bicycle frame. This severely limits the steering capability of the bicycle and consequently the user's ability to maneuver the bicycle.

Other prior art bicycle designs using integral manual drive and steering systems have sought to obviate the steering capability limitations of such designs by repositioning these systems and changing the bicycle's structure. An example of such a prior art bicycle is disclosed in U.S. Pat. No. 3,485,508 to Hudnall. In the Hudnall bicycle, the drive sprocket, hand crank and handlebars are mounted on an extension member which is securely attached to the top of the front fork journal. This positions the drive sprocket, hand crank and handlebars well forward of the front forks. In addition, the front fork journal is elongated so that it extends much higher than the steering sleeve reducing any interference between the manual drive system and the frame. However, an important disadvantage with this type of bicycle is that the hand crank assembly is positioned too far forward for effective use of the cyclist's arms and upper torso body weight in manually driving the bicycle. Moreover, positioning the manual drive assembly so far forward also moves the center of gravity (or balance) of the bicycle and rider combination thereby adversely affecting maneuverability and operability of the bicycle.

A manually driven bicycle is thus needed that will provide proper manual drive and steering capabilities while having a desired center of gravity location so that the bicycle retains desired handling and operability attributes.

SUMMARY OF THE INVENTION

It is a principal object of the invention to provide an improved manually driven bicycle in which the steering assembly is integrated with the manual drive assembly.

It is an object of the invention to provide a manually driven bicycle having a steering capability comparable to that of a standard bicycle.

It is an object of the invention to provide a manually driven bicycle allowing the user maximal use of his arms in powering the bicycle.

It is an object of the invention to provide a manually driven bicycle which is energy efficient.

It is also another object of the invention to provide a manually driven bicycle which is simple in construction to provide minimal maintenance and trouble free operation.

It is still another object of the invention to provide a bicycle capable of being both foot powered and hand or arm powered.

The bicycle of the present invention is specifically designed to provide a manually driven bicycle in which the manual drive assembly does not detract from or interfere with the desired steering capabilities of the bicycle and which does not require the user to operate the bicycle in an awkward or off balance position. Instead, the bicycle of the present invention provides the user with a front fork capable of generally the same range of rotational steering movement as a standard bicycle. Moreover, the bicycle of the present invention places the user in a position in which he may put his upper torso weight over the manual drive assembly in order to more effectively manually power the bicycle and additionally positions his hips over the pedals for effective pedaling while also keeping the center of gravity of the user and bicycle in a proper location to provide good riding and handling characteristics.

The manually driven bicycle includes both a front and rear wheel drive assembly. The front wheel drive assembly includes a drive sprocket mounted at the steering head and a driven sprocket rigidly secured to the front wheel. Both sprockets are interconnected by an endless chain so that rotation of the drive sprocket rotates the front wheel. The drive sprocket is carried by a crankshaft, and a crank and handle are connected to the crankshaft at each end thereof to enable the drive sprocket to be rotated by hand. Mounting the crankshaft and crank in the steering head at the top of the front fork journal enables the cyclist to be able to generally push straight down on the crank with the weight of his upper torso positioned over the crank to maximize power input to the crank and to the manual drive system. Thus, positioning the crankshaft in the steering head enhances manual drive energy efficiency. Moreover, the manual drive assembly has relatively few moving parts so that frictional energy losses are minimized. In addition, the use of relatively few moving parts results in a drive system having fewer parts that can wear out thereby requiring less maintenance. This also results in longer life for the assembly and more trouble free operation because there are fewer parts that can malfunction.

The front wheel drive is preferably provided with a coaster wheel braking device or alternatively a hand grip brake device operating a pair of jaws exerting a braking resistance on the front wheel. However, the bicycle may instead simply have only a rear wheel brake.

The rear wheel drive assembly is conventional and preferably includes a drive sprocket and a driven sprocket interconnected by an endless chain. The bicycle frame and seat are structured so that the user is positioned with his hips above the pedals thereby maximizing the power applied to propel the bicycle. The rear wheel is preferably also provided with a conventional coaster braking device.

An important feature of the invention is its integration of the manual steering lever with the manual operating assembly for the front wheel chain drive assembly instead of utilization of a separate pair of handlebars to steer the bicycle. Essentially, the crankshaft acts as a handlebar. Thus, the cyclist can turn the front forks to steer the bicycle while simultaneously manually driving the bicycle. However, since turning the front forks would bring the chain into proximity with the frame, the frame is bent at a front portion thereof to prevent the rotating chain from contacting the frame and hang up the chain or damage the frame. The frame is bent enough to provide sufficient clearance between the frame and the chain drive assembly to allow the front forks to be turned a desired degree deemed sufficient to provide the bicycle with a desired degree of steering capability.

Since rotation of the manual drive handle could otherwise cause the crank to contact the horizontal crossmember of the frame, in one embodiment, the horizontal crossmember is bent generally downwardly enough to provide clearance between the handle and crank and the crossmember when the front forks are turned to the limits of their desired range of rotation. The length of the crank determines the extent to which the crossmember is bent downwardly. In another embodiment, the frame is structured like a bicycle designed for a female user wherein the upper frame member between the steering sleeve and the seat post is at an angle inclined generally downward from the steering head or sleeve to the seat post. Thus, in this embodiment, the frame member is positioned so that there is a desired clearance between the frame member and crank and handle when the front forks are turned the limits of the desired range of rotation. Consequently, by obviating this potential area of interference, the front forks may be turned to the limits of the desired range of rotation to provide the bicycle with a desired or optimal degree of steering and handling capabilities.

Many people who ride bicycles as a form of exercise recognize that it is predominantly the legs that benefit from bicycling (the cardiovascular and respiratory systems benefit as well if cycling is performed as an aerobic exercise). However, the bicycle of the present invention allows the muscles of the upper part of the body to similarly be utilized in order that these parts of the body also benefit from riding the bicycle. Thus, the bicycle of the present invention helps strengthen the muscles of the hands, arms, shoulders and vital muscles of the chest and the lower back. In addition, more advanced conditioning exercise can be realized by using the front wheel drive assembly to apply braking force on the front wheel while applying motive power to the rear wheel or vice versa. Thus, the bicycle provides a relatively simple way of varying the resistance to provide more rigorous exercise.

It is also important to note that utilization of both the front and rear wheel (or manual and pedal power) can be advantageous in cycling for long distances. Alternating between using the hands and feet to power the bicycle allows one part of the body to rest while another is exercising thereby allowing the cyclist to power the cycle a much greater distance than otherwise possible. This is very advantageous for marathon cyclists. Moreover, since the cyclist may now have a choice of which set of muscles to use, the cyclist can choose to rest one set while using another to thereby go a longer distance and consequently extend the duration of aerobic exercise for enhanced aerobic conditioning. In addition, using both manual and pedal power simultaneously brings more muscles of the body into play in order to allow the bicycle to be powered up a steep incline or hill where otherwise the cyclist might have to push the bicycle up the incline or hill. These advantages are realized while providing a bicycle which has steering, handling and maneuvering attributes comparable to those of a standard bicycle.

BRIEF DESCRIPTION OF THE DRAWINGS

FIG. 1 is a perspective view of part of the seat and front portion of a first embodiment of the bicycle of the present invention having a frame similar to those of conventional bicycles for female riders.

FIG. 2 is a top plan view of the embodiment of FIG. 1 showing the lateral bend in the frame.

FIG. 3 is a front elevational view of a second embodiment of the bicycle of the present invention having a frame utilizing a conventional horizontal crossmember and also illustrating the lateral bend in the frame.

FIG. 4 is a side elevational view of the embodiment of FIG. 3 showing more clearly the vertical bend of the crossmember of the frame.

DETAILED DESCRIPTION OF THE PREFERRED EMBODIMENT

Referring to the drawings, FIGS. 1 and 2 show a first embodiment of the invention generally designated by the numeral 10.

Embodiment 10 has a frame 12 which is fundamentally similar to the frame of a standard bicycle designed to accommodate female riders because it lacks a horizontal crossmember. Embodiment 10 instead has two frame members (an upper frame member 14 and a lower frame member 16) which are connected to the steering sleeve 17 at one end of each and connected to the seat post (not shown) at the other end of each. Members 14 and 16 have laterally bent portions 20 and 22 for reasons which will be explained hereinbelow. Frame 12 is supported by front and rear wheels 24 at their axles 27.

Front wheel 24 has a driven sprocket 26. Sprocket 26 preferably includes a coaster brake assembly 28. Wheel 24 is rotatably connected to front forks (or fork) 30 which have a journal mounted in sleeve 17 to allow the front forks 30 to rotate generally horizontally in order to provide steering capability to the bicycle as with conventional bicycle designs. A crankshaft 34 is rotatably mounted in the steering head 36. Drive sprocket 38 is connected to one end of the crankshaft 34. Sprocket 38 is connected to the sprocket 26 by means of an endless chain 40 (which extends alongside the front forks 30) so that wheel 24 can be rotated by rotation of the drive sprocket 38. Thus, sprockets 26 and 38 and drive chain 40 comprise chain drive assembly or mechanism 42 for the front wheel 24. A means for manually operating the chain drive assembly 42 is generally designated by the numeral 44 and comprises crankshaft 34, crank 46 and handle 48 (although other structures may also be utilized) and allows the chain drive assembly 42 to be hand operated to rotate the wheel 24 by use of the cyclist's hands and arms and thereby propel the vehicle by means of manual power.

The crank 46 is preferably approximately 4 or 5 inches in length and the diameter of the drive sprockets 38 is preferably approximately 8 inches in diameter. However, the length of the crank 46 and the diameter of sprocket 38 as well as sprocket 26 can vary from these dimensions depending on the leverage desired or the dimensions of the bicycle component parts.

As can be seen from FIG. 2, turning the front forks 30 tends to bring the chain 40 into closer proximity to the frame 12. In order to prevent the chain 40 from so coming into contact with the frame 12 and consequently hanging up the chain 40 thereby impeding rotation of the chain drive assembly 42 or damaging the frame or chain, frame members 14 and 16 are laterally bent at portions 20 and 22, as shown. The degree to which members 14 and 16 are bent at 20 and 22 depend on the diameters of the sprockets 26 and 38 and the positioning of the front wheel 24 and the drive sprocket 26 relative to the frame 12 as well as the desired range of rotation of the front forks (for steering purposes).

The rear wheel is connected to the rear portion of the frame 12 and is preferably driven by a drive chain assembly foot operated by a pedal crank assembly. The drive chain assembly preferably comprises a drive sprocket, a driven sprocket and a drive chain (although other structures may also be utilized). Thus, embodiment 10 can be pedal powered as well as hand or arm powered. Since the cyclist can use both legs and arms to propel the bicycle, much more power is available to go up hills. In addition, the cyclist has the choice of using either his arms and legs and alternate between the two as the muscles of either get exhausted.

Upper frame member 14 is disposed so that it is inclined generally downwardly from a front portion of the frame, preferably the steering sleeve 17, to the seat post 18, as with conventional bicycles designed for female riders. Thus, the downwardly angled positioning of member 14 provides sufficient clearance between the member 14 and crank 46, as well as handle 48 when the front forks are turned. Thus, a user is able to steer and manually drive the bicycle simultaneously while comfortably seated on seat 19.

FIGS. 3 and 4 show a second embodiment 110 of the invention. Embodiment 110 has a frame 112 which, unlike the frame of embodiment 10, has a horizontal crossmember 114 interconnecting the top of the seat post 118 and the steering sleeve 117. Since crossmember 114 is higher than frame member 14 of embodiment 10, it is closer to the manual operating means 144. Frame 112 is supported by front wheel 124 and rear wheel 125 and has seat 119.

Front wheel 124 is rotatably mounted in front forks 130 and has a driven sprocket 126 which is rigidly attached thereto. Wheel axle 129 is journalled in wheel 125, and wheel axle 127 is journalled in wheel 124 so that rotation of sprocket 126 will result in rotation of front wheel 124. Sprocket 126 preferably also includes a coaster brake assembly 128 (although a hand grip type brake mechanism may also be utilized). Wheel 124 is rotatably connected to front forks 130. Front forks 130 have a journal 132 mounted in sleeve 117 to allow the front forks 130 to rotate generally horizontally in order to provide steering capability to the bicycle as with conventional bicycle designs. A crankshaft 134 is rotatably mounted in the steering head 136, and drive sprocket 138 is connected to one end of the crankshaft 134. Sprocket 138 is connected to sprocket 126 by means of an endless chain 140 so that wheel 124 can be rotated by rotation of the drive sprocket 138. Thus, sprockets 126 and 138 and drive chain 140 comprise chain drive assembly or mechanism 142 for the front wheel 126. A means for manually operating the chain drive assembly 142 is generally designated by the numeral 144 and preferably comprises crankshaft 134, crank 146 and handle 148 and allows the chain drive assembly 142 to be hand or arm operated to rotate the wheel 124 by use of the cyclist's hands and arms to thereby propel the bicycle by means of manual power.

Since the crank 146 is preferably 4 to 5 inches in length, the crank 146 and handle 148 potentially come into contact with the horizontal crossmember 114 when the front forks are turned. In order to prevent such contact which could hang up the chain 140 or damage the frame 112 or other parts of the bicycle 110, crossmember 114 is bent at portion 150 preferably generally downwardly to provide adequate clearance between the crank 146, handle 148 and the frame 112. Thus, the cyclist can turn the front forks 130 to steer the bicycle 110 at the same time he is manually rotating the crank 146 and crankshaft 134. The degree to which crossmember 114 is bent depends on the length of the crank 146, handle 148 and location of the crankshaft 134.

As with embodiment 10, frame member 116 is also laterally bent at portion 152 to prevent contact of the chain 140 with the frame member 116. The bend at portion 152 thus prevents the chain 140 from hanging up on the frame 112 and damaging the member 116, chain 140 or other parts of the bicycle 110. The degree to which frame member 116 is bent depends on the diameters of the sprockets 126 and 138 and the positioning of the front wheel 124 and the drive sprocket 126 relative to the frame 112 as well as the desired range of rotation of the front forks 130 (for steering purposes).

Rear wheel 125 is connected to the rear portion of the frame 112 and is preferably driven by a drive chain assembly 154 preferably comprising drive sprocket 156, driven sprocket 158 and drive chain 160. Pedal crank assembly 155 allows foot operation of assembly 154. Thus, bicycle 110 can be pedal and manually powered thereby providing enhanced handling and operational capabilities and flexibilities to the bicycle 110. More power can thus be applied to the wheels, or either wheel can be driven independently, if desired, in order to alternate resting and exercising sets of muscles. Although the invention has been described specifically with regard to two wheeled cycles, it can also similarly be applied to other types of multiwheeled vehicles, such as tricycles.

From the foregoing, it is apparent that the bicycle structure provides a manually driven bicycle which has very good handling characteristics and which is relatively easy for a user to ride and operate. It is to be understood that all terms used herein are descriptive rather than limiting. Although the invention has been described in conjunction with the specific embodiments set forth above, many alternatives, modifications, and variations will be apparent to those skilled in the art in light of the disclosure set forth herein. Accordingly, it is intended to include all such alternatives, embodiments, modifications and variations that fall within the spirit and scope of the invention as set forth in the claims hereinbelow.

I claim:

1. A self propelled vehicle comprising: at least one front wheel having an axle; at least one rear wheel having an axle; a front fork rotatably connected to said front wheel axle so that said front wheel can rotate relative to said front fork; a drive mechanism operably connected to said front wheel for rotating said front wheel; a frame connected at a rear portion thereof to said axle of said rear wheel so that said rear wheel can rotate relative to said frame, said frame being rotatably connected to said front fork so that said front fork can rotate relative to said frame in generally horizontal direction in order to provide steering capability to the vehicle, said frame being supported by said front wheel and said rear wheel, said frame having a portion which is bent to provide clearance between said frame and said chain drive mechanism to accommodate a desired degree of generally horizontal rotation of said chain drive mechanism upon generally horizontal rotation of said front fork during steering movement of the vehicle to provide a desired degree of steering capability to the vehicle; a manual operating means connected to said drive mechanism to enable the vehicle to be manually driven, wherein said frame is bent generally vertically to allow said frame to accommodate movement of said manual operating means relative thereto during generally horizontal rotation of said front fork relative to said frame during steering movement.

2. A self propelled bicycle comprising: a front wheel; a pair of front forks rotatably connected to said front wheel so that said front wheel can rotate relative to said front forks; a chain drive mechanism operably connected to said front wheel for rotation of said front wheel; a rear wheel; a frame rotatably connected at a rear portion thereof to said rear wheel so that said rear wheel can rotate relative to said frame, said frame being rotatably connected at a front portion thereof to said front forks so that said front forks can rotate generally horizontally relative to said frame in order to provide steering capability to the bicycle, said frame having a bent portion bent at a location of said frame to provide clearance between said frame and said chain drive mechanism to accommodate a desired degree of generally horizontal rotation of said chain drive mechanism upon generally horizontal rotation of said front forks during steering movement of the bicycle to provide a desired degree of steering capability to the bicycle; a manual operating means operably connected to said chain drive mechanism to enable the bicycle to be manually powered, and further including a frame member connecting a front portion of said frame to a medial portion of said frame to enhance structural rigidity of said frame, said frame member being disposed at an angle inclined generally downwardly from said front portion to provide sufficient clearance between said frame and said manual operating means to accommodate movement of said manual operating means relative thereto during generally horizontal rotation of said forks relative to said frame during steering movement.

3. The bicycle of claim 2, and further including a horizontal crossmember connecting a front portion of said frame to a medial portion of said frame to enhance structural rigidity of said frame, said crossmember having a bent portion bent generally downwardly to provide sufficient clearance between said crossmember and said manual operating means to accommodate movement of said manual operating means relative thereto during generally horizontal rotation of said forks relative to said frame during steering movement.

4. In a bicycle including a front wheel at the front of said bicycle and a rear wheel at the rear of said bicycle, a fork mounting said front wheel, and a steering sleeve rotatably carrying said fork, a seat post rearwardly of said steering sleeve and a seat carried on said seat post, at least one frame member extending between said seat post and said steering sleeve, pedal means for causing rotation of said rear wheel, and manually operated means for causing rotation of said front wheel, said manually operated means including a crank carried by said fork and above said steering sleeve, a first sprocket carried by said crank, a second sprocket fixed to said front wheel, and a chain drivingly connecting said first sprocket and said second sprocket, the improvement wherein said at least one frame member extends from the front of said seat post to the rear of said steering sleeve, said frame member defining a lateral bend adjacent to said steering sleeve, said bend being sufficient to allow rotation of said fork for steering said bicycle while preventing contact of said chain with said frame member.

5. In a bicycle as claimed in claim 4, said sprockets and said chain being disposed on the right hand side of said bicycle, said lateral bend extending towards the left side of said bicycle.

* * * * *